United States Patent [19]

Tanaka et al.

[11] Patent Number: 4,747,556

[45] Date of Patent: May 31, 1988

[54] REEL RECEIVER FOR A MAGNETIC TAPE FEEDING DEVICE

[75] Inventors: Shinsaku Tanaka, Tokyo; Tadao Arata, Inagi, both of Japan

[73] Assignee: Tanashin Denki Co., Ltd., Tokyo, Japan

[21] Appl. No.: 172

[22] Filed: Jan. 2, 1987

[30] Foreign Application Priority Data

May 29, 1986 [JP] Japan .................................. 61-80230

[51] Int. Cl.[4] ..................... B65H 16/02; B65H 18/02; B25G 3/10
[52] U.S. Cl. .................................. 242/68.1; 242/68.3; 403/372
[58] Field of Search ............... 242/68.1, 68, 200, 68.3; 403/372

[56] References Cited

U.S. PATENT DOCUMENTS

| | | | |
|---|---|---|---|
| 3,791,604 | 2/1974 | Meermans | 242/68.3 |
| 4,147,445 | 4/1972 | Claesson | 403/372 |

FOREIGN PATENT DOCUMENTS 1504301 3/1978 United Kingdom .

Primary Examiner—John M. Jillions
Assistant Examiner—Steven M. DuBois
Attorney, Agent, or Firm—Wegner & Bretschneider

[57] ABSTRACT

A reel receiver for a magnetic tape feeding device wherein loading of a cassette thereto and assembly thereof is facilitated. The reel receiver comprises a shaft member having a base end secured to a chassis and having an annular groove formed around an intermediate portion thereof, a reel receiver base member mounted for rotation on the shaft member, a reel driving member having an axial center hole formed therein in which the reel receiver base member is press fitted integrally with the reel driving member, the axial center hole having an end closed by a top end portion of the reel driving member, the reel driving member further having a bearing recess formed in the top end portion thereof contiguously to the axial center hole for receiving an end portion of the shaft member therein, and a cylindrical member made of an elastic material and located in a spacing center hole of the reel driving member defined by the reel driving member and the reel receiver base member, the cylindrical member having an axial center hole formed therein through which the shaft member extends, the cylindrical member being partially received in the annular groove of the shaft member to prevent the reel receiver base member from coming off the shaft member.

6 Claims, 2 Drawing Sheets

REEL RECEIVER FOR A MAGNETIC TAPE FEEDING DEVICE

BACKGROUND OF THE INVENTION

1. Field of the Invention

This invention relates to a reel receiver for a magnetic tape feeding device.

2. Description of the Prior Art

A typical one of conventional reel receivers for a magnetic tape feeding device is shown in FIG. 3. Referring to FIG. 3, a sleeve 34 is mounted for rotation on a shaft member 32 which is secured at a base end thereof to a chassis 31. A reel driving member 35 is integrally mounted on the sleeve 34 by press fitting. A washer 36 is fitted at a portion adjacent the other end of the shaft member 32 for preventing the sleeve 34 and the reel driving member 35 from coming off the shaft member 32.

However, such an arrangement as described above has the following problems. In particular, if the shaft member 32 extends upwardly from the top of the reel driving member 35, the vertical dimension of the entire reel receiver is disadvantageously increased accordingly, and it is not preferable in design. Therefore, the reel driving member 35 has a recess 40 formed therein and the coming off preventing washer 36 is located within the recess 40 so that the shaft member 32 may not extend upwardly from the reel driving member 35. However, where the recess 40 has a large diameter, the reel driving member 35 has a large flat face at the top thereof, which will make loading of a cassette difficult. Therefore, the diameter of the recess 40 must be made as small as possible, involving reduction of the size of the washer 36. However, it is a very difficult operation to fit the washer 36 of such a small size into an annular groove 32a of the shaft member 32 within the recess 40 of such a small diameter. Besides, due to the necessity for mounting of the washer 36, the end of the reel driving member 35 must necessarily be opened widely. This raises a problem that dust may be admitted into sliding sections between the shaft member 32 and the sleeve 34 and between the shaft member 32 and the reel driving member 35 by way of the opening of the reel driving member 35.

SUMMARY OF THE INVENTION

It is an object of the invention to provide a reel receiver for a magnetic tape feeding device wherein loading of a cassette thereto and assembly thereof can be facilitated.

According to the invention, there is provided a reel receiver for a magnetic tape feeding device, which comprises a shaft member having a base end thereof secured to a chassis and having an annular groove formed around an intermediate portion thereof, a reel receiver base member mounted for rotation on said shaft member for receiving a rotating power thereon, a reel driving member having an axial center hole formed therein in which said reel receiver base member is press fitted in an integral relationship with said reel driving member, said axial center hole having an end closed by a top end portion of said reel driving member, said reel driving member further having a bearing recess formed in said top end portion thereof in a contiguous relationship to said axial center hole for receiving an end portion of said shaft member therein, and a cylindrical member made of an elastic material and located in a spacing of said center hole of said reel driving member defined by said reel driving member and said reel receiver base member, said cylindrical member having an axial center hole formed therein through which said shaft member extends, said cylindrical member being partially received in said annular groove of said shaft member to prevent said reel receiver base member from coming off said shaft member.

With the construction described above, by pushing the reel driving member together with the reel receiver base member onto the shaft member, the cylindrical member is pushed toward and along the shaft member so that it is fitted into the annular groove of the shaft member. Accordingly, such a troublesome operation to fit a washer onto a shaft member with a reel driving member held in a pushed down position as in a conventional arrangement is unnecessary. Further, since the necessity of widely opening the top of the reel driving member is eliminated, the top of the reel driving member can be rounded to facilitate loading of a cassette. Besides, since the top end of the reel driving member is closed, such a disadvantage that dust may enter between the shaft member and the cylindrical member can be eliminated.

The above and other objects, features and advantages of the present invention will become apparent from the following description and the appended claims, taken in conjunction with the accompanying drawing.

DESCRIPTION OF THE PREFERRED EMBODIMENTS

Figure 1:
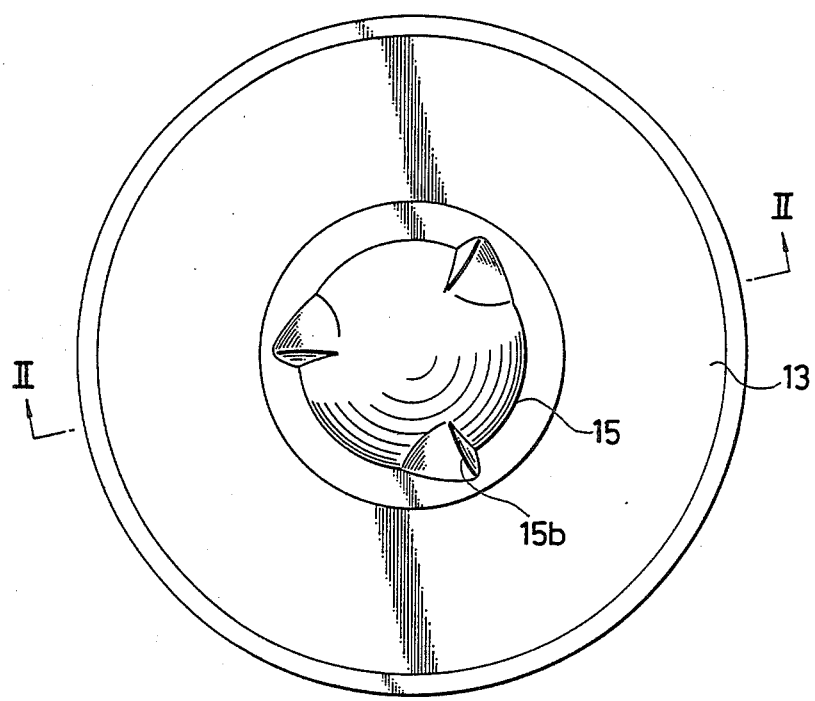
FIG. 1 is a plan view showing general construction of a reel receiver for a magnetic tape feeding device according to an embodiment of the present invention.

Now, the present invention will be described in detail with respect to an embodiment thereof shown in the drawings.

Figure 2:
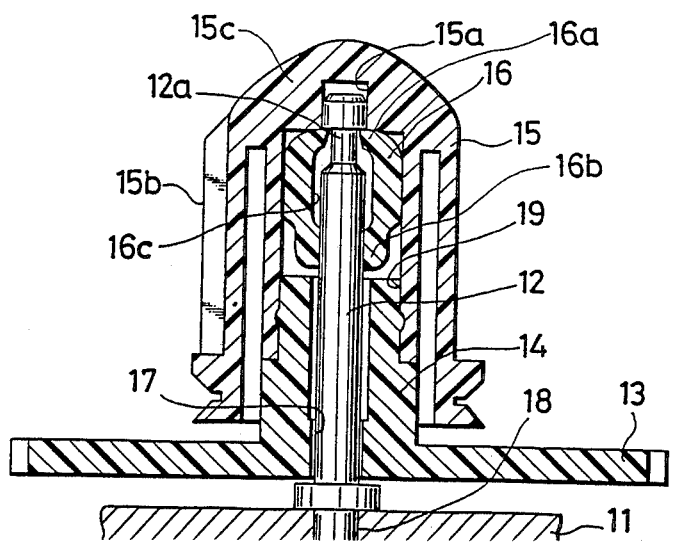
FIG. 2 is a sectional view taken along line II—II of FIG. 1.
Figure 3:
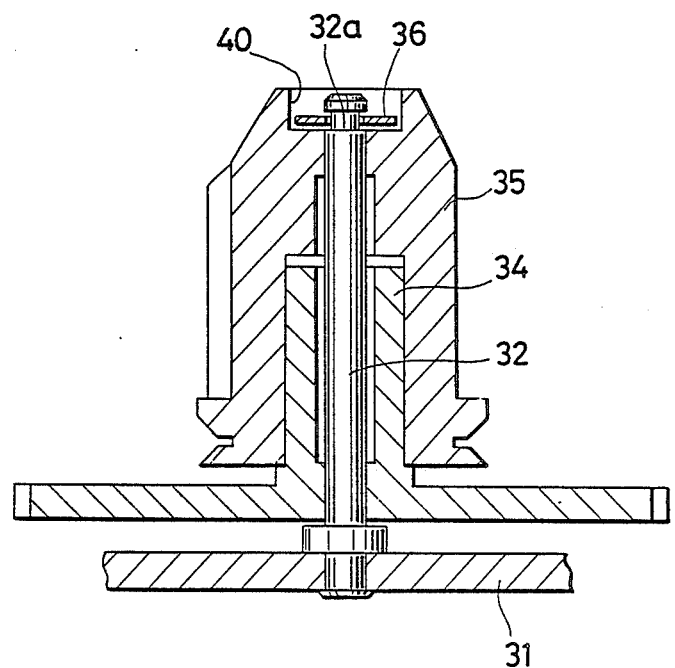
FIG. 3 is a similar view but showing general construction of a typical one of conventional reel receivers for a magnetic tape feeding device.

Referring to FIGS. 1 and 2, a reel mounting shaft (shaft member) 12 made of a metal material is secured at a base end thereof by suitable means such as riveting to a chassis 11 formed from a metal plate. The reel mounting shaft 12 has an annular groove 12a formed around a portion adjacent the other free end thereof.

A sleeve (reel receiver base member) 14 made of a synthetic resin or a like material is fitted for rotation on the reel mounting shaft 12 and has a gear 13 formed in an integral relationship therewith. A reel driving member 15 for engaging with a reel of a cassette not shown is integrally mounted on the sleeve 14 by press fitting. The reel driving member 15 is made of a synthetic resin or a like material and has a plurality of, 3 in the embodiment, reel engaging projections 15b, a sliding portion 17 at which the reel driving member 15 is mounted for rotation around the shaft member 12, and a riveted portion 18 at which the reel driving member 15 is secured to the chassis 11. The reel driving member 15 further has an inner bore or axial center hole 19 formed therein. The inner bore 19 is opened at a lower end thereof, and an upper portion of the sleeve 14 is press fitted in a lower portion of the inner bore 19 of the reel driving member 15. The other upper end of the inner bore 19 is closed by a top portion 15c of the reel driving member 15, and the top portion 15c is rounded so that it may taper off upwardly. A bearing recess 15a for receiving the free end of the shaft member 12 therein is formed in a contiguous relationship to the inner bore 19 in the top portion 15c of the reel driving member 15.

A cylindrical member 16 in the form of a cylindrical body for preventing the sleeve 14 from coming off the reel mounting shaft 12 is accommodated in a spacing of the inner bore 19 defined by the sleeve 14 and the reel driving member 15. The cylindrical member 16 is made of an elastic material such as a synthetic resin material and has an outer diameter substantially equal to or a little greater than the diameter of the inner bore 19 of the reel driving member 15. The cylindrical member 16 has an axial center hole 16c formed for passing the reel mounting shaft 12 therethrough. The center hole of the cylindrical member 16 is diametrically expanded at an intermediate portion thereof in an axial direction of the cylindrical member 16 and is thus spaced from an outer periphery of the reel mounting shaft 12 as seen in FIG. 2 but has, at an upper portion 16a and a lower end portion 16b thereof, a diameter a little smaller than the outer diameter of the reel mounting shaft 12 so that when the cylindrical member 16 is fitted in position on the reel mounting shaft 12, the inwardly drawn upper end portion 16a thereof is received or fitted in the groove 12a adjacent the free end of the reel mounting shaft 12 to prevent the cylindrical member 16 from coming off the reel mounting shaft 12. Meanwhile, the lower end portion 16b of the cylindrical member 16 is offset or tapered at an outer periphery thereof so that it has an outer diameter smaller than the diameter of the inner bore 19 of the reel driving member 15 and hence is spaced from an inner periphery of the reel driving member 15 as seen in FIG. 2.

In assembling the components mentioned above, at first the cylindrical member 16 is inserted into the inner bore 19 of the reel driving member 15, and in this condition, the reel driving member 15 is pushed toward the sleeve 14 from above to press fit the reel driving member 15 onto the sleeve 14 to establish an integral relationship therebetween. After then, the sleeve 14 and the reel driving member 15 are pushed onto the reel mounting shaft 12 from the free end side toward the base end side of the latter. Consequently, the cylindrical member 16 is pushed downwardly along the reel mounting shaft 12 so that it is fitted at the drawn portion 16a thereof into the groove 12a adjacent the free end of the reel mounting shaft 12.

As the cylindrical member 16 is fitted in this manner, at first the elasticity or resiliency of the cylindrical member 16 itself and the tapered or chamfered top end of the reel mounting shaft 12 will allow the lower end portion 16b of the cylindrical member 16 having a smaller inner diameter than the outer diameter of the shaft 12 to be expanded outwardly thereby to allow the cylindrical member 16 to be fitted on the shaft 12. In this instance, the offset or reduced diameter of the lower end portion 16b of the cylindrical member 16 will prevent the lower end portion 16b from interfering with the inner wall of the reel driving member 15 to hinder passing of the shaft 12 through the cylindrical member 16. In order to facilitate the lower end portion 16b of the cylindrical member 16 to be taken over by a portion of the shaft 12 below the annular groove 12a from a top portion of the same above the annular groove 12a, preferably the top end of the portion of the shaft 12 below the annular groove 12a is tapered outwardly downwardly in a similar manner to the top end of the shaft 12 even though the lower end portion 16b of the cylindrical member 16 at which the center hole 16c thereof has a smaller inner diameter than the outer diameter of the shaft 12 has an axial length sufficient to extend across or bridge over the annular groove 12a of the shaft 12.

Once the cylindrical member 16 is fitted in position on the reel mounting shaft 12, the lower end portion 16b of the cylindrical member 16 is resiliently and closely contacted with the outer periphery of the reel mounting shaft 12 due to its elasticity or tendency to restore its original shape in which the inner diameter of the center hole 16c thereof is smaller than the outer diameter of the shaft 12. Meanwhile, once the drawn portion 16a of the cylindrical member 16 is fitted in the groove 12a, if the reel driving member 15 is released, the sleeve 14 will never come off the reel mounting shaft 12 because the cylindrical member 16 stops the sleeve 14 with the drawn portion 16a thereof fitted in the annular groove 12a of the reel mounting shaft 12.

It is to be noted that where the outer diameter of the cylindrical member 16 is a little greater than the diameter of the inner bore 19 of the reel driving member 15, the diameter of the center hole 16c at the lower end portion 16b of the cylindrical member 16 in its natural shape need not be greater than the outer diameter of the reel mounting shaft 12 in order to establish close contact therebetween because the inner wall of the reel driving member 15 presses against the outer periphery of the cylindrical member 16 to contract the lower end portion 16b of the cylindrical member 16.

Thus, according to the present embodiment, fitting of the drawn portion 16a of the cylindrical member 16 into the groove 12a can be automatically achieved only by pushing the reel driving member 15 integrated with the sleeve 14 onto the reel mounting shaft 12. Accordingly, such a troublesome operation to fit a wahser into a groove with a reel driving member held in a pushed down position as in a conventional arrangement becomes unnecessary, and hence assembly of the entire arrangement can be achieved very easily. Further, since the top end of the reel driving member 15 is not opened but closed, it can be rounded to facilitate loading of a cassette. Besides, since the top end of the reel driving member 15 is closed, such a disadvantage that dust may enter between the reel mounting shaft 12 and the sleeve 14 can be eliminated. In addition, since outer and inner peripheries of the cylindrical member 16 are held in contact with an inner periphery of the reel driving member 15 and an outer periphery of the roll mounting shaft 12, respectively, if the reel receiver is employed for the tape rewinding side, that is, for a supply reel, an effect can be attained that slackening of a tape is eliminated by a resistance applied to rotation of the reel driving member 15 due to friction between the reel driving member 15 and the cylindrical member 16 and between the cylindrical member 16 and the roll mounting shaft 12.

Having now fully described the invention, it will be apparent to one of ordinary skill in the art that the present invention is not limited to the specific embodiment described above and many changes and modifications can be made thereto without departing from the spirit and scope of the invention as set forth herein. For example, the cylindrical member as a coming off preventing member must only be such that it may be fitted into the groove of the shaft member by a pressing force applied thereto upon pushing at the reel driving member and accordingly it must only have a smaller inner diameter at a portion thereof than the outer diameter of the shaft member. Further, the cylindrical member may be made of any material only if it has suitable elasticity, and for example, nylon may be used therefor. Further, it is also possible to form a recess or slit in an axial direction on the cylindrical member in order to increase the elasticity and hence the deformability of the cylindrical member. Further, the shapes and materials of the individual components can be suitably changed depending upon specifications.

As described in detail hereinabove, according to the present invention, a cylindrical member as a coming off preventing member can be fitted into a groove adjacent an end portion of a shaft member only by pushing a reel driving member onto the shaft member. Accordingly, an effect can be attained that the reel driving member can be assembled very easily. Further, since the top end of the reel driving member is closed, another effect can be attained that dust is prevented from entering between contacting portions of components of the reel receiver. In addition, since the top end of the reel driving member can be rounded, a further effect can be attained that loading of a cassette can be facilitated.

What is claimed is:

1. A reel receiver for a magnetic tape feeding device, comprising: a shaft member having a base end thereof secured to a chassis and having an annular groove formed around an intermediate portion thereof; a reel receiver base member mounted for rotation on said shaft member for receiving a rotating power thereon; a reel driving member having an axial center hole formed therein in which said reel receiver base member is press fitted in an integral relationship with said reel driving member, said axial center hole having an end closed by the closed top end portion of said reel driving member, said reel driving member further having a bearing recess formed in the top end portion thereof in a contiguous relationship to said axial center hole for receiving an end portion of said shaft member therein; and a cylindrical member made of an elastic material, said cylindrical member having an intermediate portion in elastic press-contact with the inner circumferential wall of said axial center hole of said reel driving member and wherein, prior to press fitting of said reel driving member and said reel receiver base member, the outer diameter of said intermediate portion of said cyindrical member is greater than the diameter of the inner bore of said axial center hole of said reel driving member, said cylindrical member having an axial center hole formed therein through which said shaft member extends, said cylindrical member having an upper end portion received in said annular groove of said shaft member and said cylindrical member having a lower end portion in elastic press-contact with the outer circumferential wall of said shaft member, to prevent said reel receiver base member from coming off said shaft member.

2. A reel receiver for a magnetic tape feeding device according to claim 1, wherein said upper end portion of said cylindrical member has an inner diameter smaller than the outer diameter of said shaft member whereby said upper end portion of said cylindrical member is received in said annular groove of said shaft member.

3. A reel receiver for a magnetic tape feeding device according to claim 2, wherein said center hole of said cylindrical member has at said lower end portion of said cylindrical member, an inner diameter a little smaller than the outer diameter of said shaft member.

4. A reel receiver for a magnetic tape feeding device according to claim 3, wherein said lower end portion of said cylindrical member has a smaller outer diameter than the inner diameter of said center hole of said reel driving member.

5. A reel receiver for a magnetic tape feeding device according to claim 4, wherein said lower end portion of said cylindrical member has an axial length greater than the dimension of said annular groove of said shaft member in the axial direction of said shaft member.

6. A reel receiver for a magnetic tape feeding device according to claim 4, wherein said end portion of said shaft member adjacent said annular groove between the one and the other ends of said cylindrical member is tapered so as to facilitate fitting of said cylindrical member on said shaft member.

* * * * *